United States Patent [19]

Froberg et al.

[11] 4,298,369

[45] Nov. 3, 1981

[54] GLASS MANUFACTURING PROCESS HAVING BORON AND FLUORINE POLLUTION ABATING FEATURES

[75] Inventors: Magnus L. Froberg, Granville; Charles F. Schroeder, Toledo, both of Ohio

[73] Assignee: Owens-Corning Fiberglas Corporation, Toledo, Ohio

[21] Appl. No.: 135,061

[22] Filed: Mar. 31, 1980

[51] Int. Cl.$^3$ ............................................. C03B 5/16
[52] U.S. Cl. ........................................ 65/27; 65/135; 65/335; 501/53
[58] Field of Search ........................... 65/27, 135, 335; 106/54, DIG. 8

[56] References Cited

U.S. PATENT DOCUMENTS

| | | |
|---|---|---|
| 1,858,413 | 5/1932 | Noack et al. |
| 3,032,392 | 5/1962 | Nies et al. |
| 3,789,628 | 2/1974 | Mahoney ............................... 65/27 |
| 3,880,639 | 4/1975 | Bodner et al. ........................ 65/134 |
| 4,042,667 | 8/1977 | Ishiwata et al. .................... 423/240 |
| 4,074,989 | 2/1978 | Brzozowski et al. .................... 65/27 |

FOREIGN PATENT DOCUMENTS 1555920 11/1979 United Kingdom.

OTHER PUBLICATIONS

"Kinetics of the Reaction of $SO_2$ with Calcined Limestone", R. Borgwardt, Environmental Science & Technology, vol. 4, No. 1, Jan. 1970, pp. 59 et seq.
"$SO_2$ Pick Up by Limestone & Dolomite Particles in Flue Gases", by R. W. Coutant, Journal of Engineering for Power, Apr. 1970, pp.113 et seq.
Kirk–Othmer Encyclopedia of Chemical Technology, pp. 649, 650, vol. 3, Calcium Borates & Synthesis.

*Primary Examiner*—Arthur D. Kellogg
*Attorney, Agent, or Firm*—Ronald C. Hudgens; Robert F. Rywalski

[57] ABSTRACT

Boron and/or fluorine values are reclaimed from a boron and/or fluorine laden gas stream emanating from a glass melter by means of a preheating bed of glass-forming batch agglomerates. The boron and/or fluorine values in such gases are first reacted with a boron and/or fluorine reactive material and the gases then conveyed into such a preheating bed to separate at least a portion of the reaction products.

7 Claims, 1 Drawing Figure

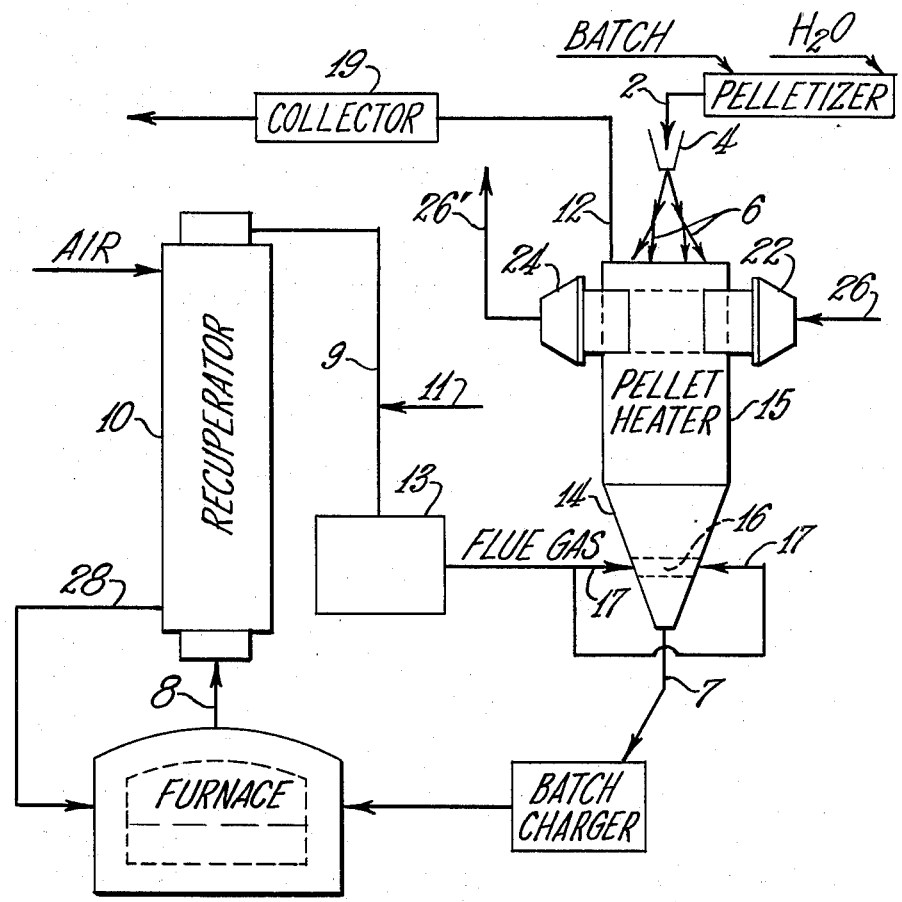

GLASS MANUFACTURING PROCESS HAVING BORON AND FLUORINE POLLUTION ABATING FEATURES

TECHNICAL FIELD

The present invention relates to the art of glass manufacturing. More particularly, this invention relates to glass manufacturing wherein glass forming batch ingredients in the form of agglomerates are preheated with flue gases emanating from a fossil fuel fired melter. Even yet more particularly, this invention relates to recovering boron and/or fluorine values from such gases by means of such agglomerates.

BACKGROUND AND SUMMARY

Glass, for many years, has been manufactured by a process wherein particulate, glass forming batch ingredients were dispensed into a glass melter, for example a fossil fuel fired melter, then vitrified and formed into articles of commerce. More recently the glass industry, like society as a whole, has become acutely aware of the shortages of energy and the need to improve the quality of our environment or atmosphere. Consequently, steps have been taken to provide for glass manufacturing processes which consume lesser amounts of energy, minimize pollution, and increase the throughput, or output, of the melting furnaces employed. One technique which has been developed to accomplish this involves combining glass batch ingredients and water into agglomerates, for example, pellets or briquettes, and then conveying hot effluent gases from above a pool of molten glass in a melter through a bed of such agglomerates so as to dry and preheat the agglomerates, and thereby recover otherwise wasted energy, and likewise to recover, in the bed of agglomerates, materials which otherwise could pollute the atmosphere. The individual preheated agglomerates are then fed to the melting furnace and melted. While such processes have improved the efficiency of melting, for example, by providing for higher throughputs per square foot of melter area, and have decreased the amount of wasted energy, such processes still need improvement in their pollution abating characteristics.

With the foregoing in mind, it is the general object of the present invention to provide for a glass manufacturing process which makes efficient use of energy, has a high melter throughput, and which has improved pollution abating characteristics. More specifically, it is the object of this invention to improve the recovery of boron values and/or fluorine values carried by furnace effluent gases to thereby minimize atmospheric pollution. These values are then recycled into the melter and, consequently, once the process reaches equilibrium, an adjustment may be made to the batch composition to employ lesser amounts of glass making raw materials.

Thus, in accordance with the present invention, there is provided an improvement in glass manufacturing processes of the type comprising combining glass batch ingredients, including a source of fluorine and/or boron, with water into agglomerates, conveying hot, boron and/or fluorine containing, effluent gases from above a pool of molten glass to a bed of agglomerates and passing such gases directly therethrough so as to preheat the agglomerates to an elevated temperature, for example a temperature in excess of at least about 500° C., feeding the preheated agglomerates to a glass melting furnace and melting the agglomerates therein. The improvement essentially resides in introducing a fluorine and boron reactive material into the hot gases prior to passing the gases through the bed of agglomerates, reacting boron and fluorine values in the gases with said material at a temperature, for example, in excess of about 500° C. and then recovering the reaction product thereof in the bed upon passage of the gases therethrough. As used herein, the terms "boron" and "fluorine" generally comprehend any compounds existing in the glass manufacturing process which contain boron or fluorine and includes even the elemental forms. Preferred sources of boron and fluorine for a glass manufacturing batch as provided herein will be colemanite which has been treated to remove substantially all of its chemically bound water, i.e., calcined colemanite, and sodiumsilicofluoride. Exemplary of the forms in which boron and fluorine may exist when being conveyed in the flue gases from the melting furnace are the compounds $H_3BO_3$, $HBO_2$, $HF$, and $BF_3$.

In accordance with another feature of this invention, there is provided an improvement in glass manufacturing processes of the type comprising providing a gravitationally downwardly flowing vertical bed of glass batch agglomerates, said agglomerates containing a source of fluorine and/or boron, passing flue gases emanating from a combustion fired melting furnace directly through said vertical bed to preheat the agglomerates, said flue gases containing fluorine and/or boron values, and melting said preheated agglomerates in the combustion fired furnace. The improvement comprises decreasing the fluorine and/or boron content of the gases after passage through the bed by reacting the fluorine and/or boron values in the gases, prior to passage through said bed and while the gases generally have an absolute humidity substantially no higher than their absolute humidity upon leaving the furnace, with an alkaline earth metal oxide, or a precursor compound of such oxide. In so reacting the boron and/or fluorine, the reaction products are then recovered in the agglomerate bed and recycled into the melting furnace. In this way, the amount of boron in the flue gases after passage through the preheating bed can be decreased by as much as 30 or 35 percent or even more, and the amount of fluorine can be decreased by as much as 15 or 20 percent or even more.

THE DRAWING

FIG. 1 is a schematic flow diagram exemplifying a process for industrially exploiting the present invention.

DESCRIPTION

Referring to FIG. 1, it will be seen that glass forming batch materials, and water, are converted into individual agglomerates, preferably pellets, on a rotating disc pelletizer. The free water content of the pellets will vary with different batches, but generally may be about 10–20 percent by weight (dry basis). While not shown, the pellets, if desired, may be subjected to a screening operation to select pellets of a nominal size of about ⅜ inch to ⅝ inch in diameter. These pellets are then transported by suitable means 2, such as a belt conveyor, to a feed hopper 4 and then, in turn, the pellets, through a spider-like feeding arrangement 6, are fed to a pellet heater 15 which maintains a vertical bed of pellets (not shown) therein. The individual pellets generally move gravitationally downwardly in the bed of the pellet heater and are discharged therefrom as hot, individual pellets and supplied by a duct member 7 to a batch charger which conveys them to a fossil fuel fired glass melting furnace. The combustion gases, or flue gases, which carry boron and/or fluorine values from the melting furnace are conveyed by suitable means 8, for example, a duct, to a recuperator 10 where they are indirectly cooled with air, for example, from a temperature of about 1427° C. to a temperature in excess of about 500° C. and more typically to a temperature of about 760° C.–816° C. The then indirectly heated air is supplied, through appropriate ducts 28, for use as combustion make-up air. The flue gases, after passage through recuperator 10, are then conveyed by suitable duct means 9 to the pellet heater where they flow in direct countercurrent contact with the pellets, to dry the pellets and preheat them to an elevated temperature. The flue gases leave the pellet heater through a suitable outlet designated 12 and if desired may be passed through a secondary pollution abating device 19. This device may take the form of a cyclone or bag collectors. Preferably, the flue gases will be supplied to the pellet heater by a manifold-type arrangement with entrances into the heater being on diametrically opposed sides of a lower frusto-conical portion 14 of the preheater 15. In accordance with sound engineering practices, the gases will be distributed generally uniformly into the heater preferably by employing an inverted "V" shaped member 16 which generally spans frusto-conical portion 14. The manifold-type gas inlet under the inverted "V" shaped member 16 is generally exemplified in the drawings by 17. Disposed intermediate the outlet of recuperator 10 and the inlet of pellet preheater 15 is a chamber 13, in the nature of a slag box, through which the flue gases pass and which provides an opportunity to remove large particulate material being pneumatically conveyed in the flue gases from the furnace.

Disposed intermediate chamber 13 and the exit of the flue gases from the recuperator there is schematically illustrated the preferred mode of practicing this present invention by adding a boron and/or fluorine reactive material into the flue gas stream. Since there is no cooling of the flue gases by evaporative contact with any water spray, the flue gases, at the point of introduction of the reactable material, will have substantially the same absolute humidity as that of the gases exiting from the furnace. The reactable material is introduced by a device schematically illustrated at 11 which device preferably is a volumetric screw feeder. In order to more uniformly disperse the material into the flue gas stream, an air injection system is desirable and it will also be found desirable to protect the barrel, in which the screw feeder rotates, by providing a jacket therefor in which an appropriate cooling medium is circulated. Water can be employed as such a cooling medium.

In order to assist in controlling the temperature of the flue gases in the pellet heater and those liberated therefrom, a heat exchanger positioned in the pellet heater may be employed. As generally illustrated in the drawings, the heat exchanger comprises an inlet manifold 22 to which is supplied a suitable heat transfer medium via duct 26 and disposed on the opposite side externally of the pellet hopper is an outlet manifold 24 from which the heated heat transfer medium is removed by a duct 26'. In fluid communication with the two manifolds will be a plurality of duct members (not shown) which are generally located in the pellet bed. Further details with respect to the arrangement set forth in the drawings can be seen in U.S. Pat. No. 4,184,861. Additionally, it will generally be found desirable to dilute the flue gases passing through the pellet heater with ambient air. Such ambient air may be added at any convenient location. Generally, the overall process will be operated such that the temperature of the gases exiting preheater 15 in duct 12 will have a temperature of less than about 450° F. (232° C.), more desirably, less than about 400° F. (204° C.), and even more suitably, less than about 300° F. (149° C.). It will, of course, be readily apparent to those skilled in the art that the temperature should not be allowed to drop so low as to be below the dew point of the gases, as undesirable condensation will result.

The above arrangement is ideally suited for manufacturing a wide variety of glasses, but is especially well adapted for the manufacture of boron and/or fluorine containing fiberizable textile glasses. Exemplary of these glasses are low alkaline metal oxide containing glasses, for example, glasses containing, if at all, less than about 3 percent by weight of alkaline metal oxides and more typically less than 1 percent by weight. Further exemplary of such glasses are the alkaline earth aluminosilicates where, for example, the cumulative amount of the alkaline earth oxides plus alumina plus silica is in excess of about 80 percent by weight, and quite commonly in excess of about 90 percent up to in some instances virtually 100 percent by weight. Specifically exemplary textile glasses are those commonly referred to in the art as E-glass which may be categorized as an alkaline earth aluminoborosilicate glass. The latter type glasses typically will comprise at least about 85 percent by weight and more commonly on the order of about 93–95 percent by weight of silica plus alumina plus alkaline earth metal oxides plus boric oxide. Such glasses also include fluorine and may include such other adjuvants as iron oxide, titanium dioxide, and strontium oxide.

When the more common glasses are contemplated for the practice of this invention, for example, bottle glass and flat glass which typically contain alkaline metal oxides in excess of that noted above, it is preferred to dry and preheat the agglomerates in accordance with the teachings of co-pending U.S. application Ser. No. 095,870 now U.S. Pat. No. 4,248,615 and Ser. No. 095,871, now U.S. Pat. No. 4,248,616 both of which are hereby incorporated by reference.

While the above, and the example which follows, show a preferred manner of practicing this invention is using pellets, it will be apparent that any agglomerate forms may be employed. Such agglomerates are composite, integral self-supporting masses consisting essentially of all the substantial batch materials and may take the form of balls, extrusions, discs, briquettes and the like.

Best results will be obtained if preheater 15 is designed with certain criteria in mind. First of all, as exemplified in the drawing, the pellet preheater will include an upper cylindrical portion and a lower frusto-conical portion. Generally, considering the diameter of the cylindrical portion as D, the height of the cylindrical portion should be about 1-2 times D and the height of the frusto-conical portion should be about one and one-half times D. The inverted "V" shaped gas distributor 16 should generally be located in the frusto-conical portion so that the area under the inverted "V" is about 50% of the total conical cross section at that position, with the height of the pellet bed being maintained at least about 0.3–0.5 times D above the flow distributor. Additionally, it will be desirable that the included angle between diametrically opposed sidewall portions of the lower frusto-conical portion 15 be approximately 30-45 degrees, and preferably 35 or 36 degrees. Generally it is preferred that the superficial velocity of the flue gases through the cylindrical portion with a diameter D be between about 20 to 60 standard feet per minute.

The preferred boron and/or fluorine reactable material will be an alkaline earth metal oxide, or a precursor to such oxide, e.g., a compound which when heated will decompose to the oxide. Such compounds may, for example, be the hydroxides or the carbonates. Most desirably, the material employed will be calcium oxide, calcium hydroxide, or calcium carbonate. Dolomitic materials, e.g., burnt dolomite, are also suitable. The amount of the reactable material which is introduced into the flue gases should at least be a stoichiometric amount and preferably a substantial excess. Preferably, when employing an alkaline earth metal compound, that compound, on an oxide basis, will be added at such a rate that the weight ratio of the oxide to the total boron (B) and/or flourine (F) flowing in the gases coming from the recuperator will be at least 4 and more typically in substantial excess thereof, for example, about 5-10 times that ratio or even higher. Those skilled in the art will routinely adjust the ratio to obtain optimum results for any given operation.

While the above sets forth the invention so as to enable those skilled in the art to make and use same, nonetheless further exemplification of the present invention follows.

Pellets were manufactured having a water content of approximately 17 percent by weight (dry basis) using the pelletization technique and control disclosed now U.S. Pat. No. 4,212,613. The specific batch employed contained about 12.5 percent by weight of calcined colemanite. Additionally, the batch included approximately 24.9 percent limestone, 31.6 percent sand, 30.1 percent clay, and approximately 0.9 percent of sodium-silicofluoride. The particle size of the batch employed, as measured by Microtrac analyzer, showed 100 percent of the particles being smaller than 176 microns, 81.2 percent smaller than 44 microns, 54.0 percent smaller than 16 microns, 30.5 percent smaller than 5.5 microns, and 12.6 percent smaller than 2.8 microns, with the surface area of the batch being approximately 0.84 square meters per cubic centimeter and an average particle diameter of about 22.6 microns. The specific pellet hopper employed had a diameter of about 8-9 feet and the total height of pellets in the pellet preheater (from the bottom of the frusto-conical discharge portion to the top of the bed) was approximately 18 feet. Flue gases exiting from the recuperator had a temperature of about 1400°-1500° F. and the temperature of the gases exiting from the pellet preheater was generally maintained at less than about 400° F. The pull rate on the furnace employed was approximately 1,100 pounds per hour.

In a controlled run, no reactive material was employed and, referring to Table 1, it will be seen that when no calcium oxide was added the amount of total boron in the gases exiting from the pellet hopper in duct 12 was about 0.495 pounds per hour. Similarly, since the flue gases also contained fluorine, the total amount of fluorine in the gases exiting from the pellet hopper was approximately 0.391 pounds per hour without the addition of any CaO. Table 1 then shows, in pounds per hour, the amount of boron and the amount of fluorine in the flue gases exiting from the hopper when CaO was added to the flue gas using a volumetric feed screw for rates of 10 and 20 pounds per hour, respectively.

Thus, it will be seen from Table 1 that the total amount of boron was decreased by about 35.3 percent when using 10 pounds per hour of CaO addition and about 36.7 percent when employing 20 pounds per hour of CaO. Simultaneously with the boron reaction and removal in the bed, the total fluorine was decreased by about 21.7 percent at the 10 pound per hour addition and about 23.5 percent at the 20 pound per hour addition. Thus, it will be seen that a substantial simultaneous decrease in the amount of boron and fluorine emitted from the pellet hopper was attained by injecting calcium oxide into the flue gas stream which carried boron and fluorine values.

TABLE 1

| | Boron (#/hr) | | | Fluorine (#/hr) | |
|---|---|---|---|---|---|
| No CaO | 10#/hr. CaO | 20#/hr. CaO | No CaO | 10#/hr. | 20#/hr. |
| 0.495 | 0.320 | — | 0.391 | 0.306 | — |
| 0.495 | — | 0.313 | 0.391 | — | 0.299 |

As will be readily apparent from the foregoing, the boron and/or fluorine reactive material will desirably be added in solid particulate form. The size of the material employed desirably will be such that it can be pneumatically conveyed in the flue gas stream. Of course, therefore, the size will vary with different installations, depending upon the velocity of the flue gases. Generally, however, it is preferred that the particle size of the material employed be relatively small, e.g., about 80-95% of the material will be less than 325 mesh (U.S. Sieve).

While the foregoing sets forth the present invention, it will, of course, be apparent that modifications may be made which pursuant to the Patent Statutes and Laws do not depart from the spirit and scope thereof.

We claim:

1. In a glass manufacturing process comprising combining glass batch ingredients, including a source of fluorine and boron, with water into agglomerates, conveying hot, boron and fluorine containing, effluent gases from above a pool of molten glass to a bed of agglomerates and passing said gases directly thereto so as to preheat said agglomerates to a temperature in excess of at least about 500° C., feeding said preheated agglomerates to a glass melting furnace and melting said agglomerates therein, the improvement comprising introducing a fluorine and boron reactive alkaline earth metal oxide, or a precursor of said oxide, into said hot gases prior to passing said gases through said bed of agglomerates, reacting fluorine and boron in said gases and said reactive material at a temperature in excess of about 500° C. and recovering a reaction product thereof in said bed upon passage of said gases therethrough.

2. The process of claim 1 wherein said reactive material is calcium hydroxide.

3. The process of claim 1 wherein said reactive material is calcium oxide.

4. The process of claim 1 wherein said reactive material is calcium carbonate.

5. In a glass manufacturing process comprising providing a gravitationally downwardly flowing vertical bed of glass batch agglomerates, said agglomerates containing a source of fluorine and/or boron, passing flue gases emanating in a combustion fired melting furnace directly through said vertical bed to preheat said agglomerates, said flue gases containing fluorine and/or boron, and melting said preheated agglomerates in said combustion fired furnace, the improvement comprising decreasing the fluorine and/or boron content of the gases passing through said bed by reacting said contained fluorine and/or boron in said flue gases, while said gases have an absolute humidity substantially no higher than the absolute humidity of said flue gases as they emanate from said furnace, with an alkaline earth metal oxide, or a precursor to said oxide, prior to passing said flue gases through said bed.

6. The process of claim 5 wherein said reacting is done while said flue gases have a temperature of at least about 500° C.

7. The improvement of claim 1 wherein the amount of boron in the gases after passage through the bed is decreased at least 30% and fluorine is decreased at least 15%.

* * * * *